United States Patent

Reynolds et al.

[15] 3,668,665

[45] June 6, 1972

[54] APPARATUS FOR ENSURING TIMING TRACK ACCURACY

[72] Inventors: Robert J. Reynolds, Ann Arbor; Virgilio J. Quiogue, Northville, both of Mich.

[73] Assignee: Burroughs Corporation, Detroit, Mich.

[22] Filed: Apr. 30, 1970

[21] Appl. No.: 33,365

[52] U.S. Cl. .......... 340/174.1 A

[51] Int. Cl. .......... G11b 27/12

[58] Field of Search .......... 340/174.1 A, 174.1 B, 174.1 G

[56] References Cited

UNITED STATES PATENTS

| | | | |
|---|---|---|---|
| 3,196,420 | 7/1965 | Francois | 340/174.1 B |
| 2,903,667 | 9/1959 | Curtis | 340/174.1 A |
| 3,212,076 | 10/1965 | Guerth | 340/174.1 B |

*Primary Examiner*—Bernard Konick
*Assistant Examiner*—Vincent P. Canney
*Attorney*—Kenneth L. Miller and Charles S. Hall

[57] ABSTRACT

A method and apparatus for precisely checking the accuracy of the placing of timing track marks or bits on the periphery of a rotating recording member, such as a magnetic disc or drum, where the spaces between all the timing track marks or bits must be exactly equal and the variations in spacing, if any, cannot be electronically measured. The timing track bits or marks are written during one revolution of the disc or drum and then read back and used as one input to a comparator. The timing track is erased and then the timing track bits are written during two successive resolutions of the disc or drum and read back as the other input to the comparator. If the amplitudes of the two inputs to the comparator are equal then the writing during the second of the two successive revolutions was directly on top of the writing during the first of the two successive revolutions and all the bit spaces are equal.

10 Claims, 1 Drawing Figure

PATENTED JUN 6 1972 3,668,665
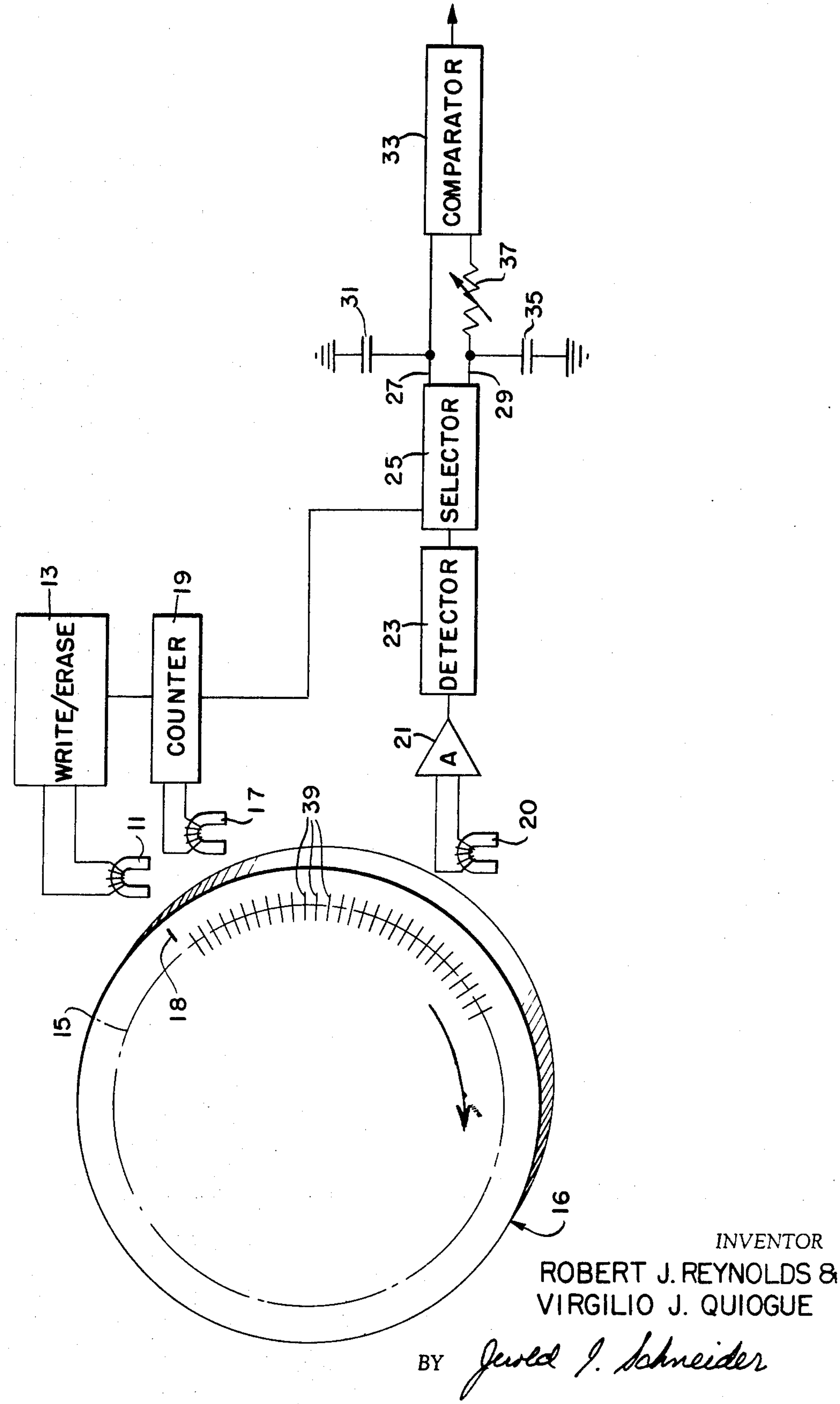
INVENTOR
ROBERT J. REYNOLDS &
VIRGILIO J. QUIOGUE
BY Jerold I. Schneider
AGENT

APPARATUS FOR ENSURING TIMING TRACK ACCURACY

BACKGROUND OF THE INVENTION

In a computer employing a rotating drum or disc memory (hereinafter referred to as a disc for convenience), it is conventional and desirable to reserve a memory channel or track on the disc for recording a timing track of uniformly spaced clock pulses. To accomplish this, either a rectangular or sine wave signal of constant frequency is initially recorded on the memory channel. This signal, when read back, will provide uniformly spaced clock pulses for synchronizing the other operations of computer. Although this method of providing clock pulses is highly efficient in theory (since the computer thereby supplies its own synchronizing signals) difficulty has been encountered in the past in recording the timing track on the disc accurately and reliably. Among the most serious problems encountered is the difficulty of precisely recording uniformly spaced wave signals to produce a timing track of the desired number of cycles with accurate in-phase overlap between the original and terminal ends of the timing track. This problem of preparing a timing track with an accurate in-phase overlap is commonly described as preparing a timing track with no measurable closure point. The closure point refers to the point where the writing of the timing track bits is started and stopped.

Various techniques have been employed to prepare a timing track with no measurable closure point. However, each of the prior art attempts has its resultant problem as will be explained. In U.S. Pat. No. 2,801,407, Lubkin, a single mark is placed on a first channel of a rotating drum and the mark is read back, frequency multiplied, and used as one input to an oscilloscope. A variable frequency oscillator supplies a plurality of signals to the other input of the oscilloscope and the frequency of the oscillator is changed until the frequencies of the two signals are equal. Then the signals from the oscillator are switched from the oscilloscope to the drum and the timing track is written. This method is based solely on the frequency of the timing bits or marks and requires the timing channel to be written on the rotating drum after the comparison is made. Therefore, if the speed of the drum should deviate during the time that the timing channel is being written, there is no method of checking to make sure that the track has been written properly.

In U.S. Pat. No. 2,926,341, Scarbrough, a similar system is used wherein an external source generates a plurality of pulses which are compared via a counter to the frequency of a single mark on the rotating drum. When the counter reaches the appropriate value indicating the correct frequency of the external source the timing track is then written on the rotating drum. Again the timing track bits may not be equally spaced since deviations in the drum speed cannot be detected and the timing track is not checked after it has been written.

SUMMARY OF THE INVENTION

With these prior art problems in mind it is the object of this invention to provide a new and improved method and apparatus for checking the recording of timing tracks based on the voltage amplitude of the timing track marks wherein the closure point cannot be electronically measured.

It is another object of this invention to detect deviations in the speed of the rotating recording member while the spaces between the timing track marks are being tested for equality.

These and other objects of the invention are accomplished in a timing track recording method and apparatus wherein the timing track bits or marks are recorded during a single revolution of the recording member, read back, and the amplitude of the readback signal is used as one input to a comparator. The track is erased and the timing track is again written during two successive revolutions of the recording member. This timing track is also read back and the amplitude of the readback signal is used as the other input to the comparator. If the two inputs to the comparator are equal then there is no electronically measurable closure point and the proper timing track is on the rotating recording member. This is based on the principle that if timing track bit spaces or pulse widths, for a particular frequency, are optimized to give a maximum amplitude read back voltage, then any subsequent recording of a second timing track of the same frequency and pulse width on top of the first timing track, will cause a reduction in the read back voltage if the second track's bit spaces are not in precise coincidence or phase with the first track's bit spaces or pulse widths. In addition, even if the timing track bit spaces are not optimized, phase deviations between the first and second recorded timing tracks are readily detectable from the resulting increased or decreased read back voltage amplitudes. The relative alignments of the magnetic dipoles of the magnetic material cause this phenomena, as would be apparent to one skilled in the art.

DESCRIPTION OF THE FIGURE

The objects of the invention and the advantages which may be attained by its use will be more apparent on reading the detailed description of the invention taken in conjunction with the drawing.

In the drawing the single FIGURE represents a schematic circuit for practicing the invention.

DETAILED DESCRIPTION

This invention may be used with a rotating recording member such as a disc or drum. If a drum is used, the timing track is on the outside of the drum and usually at one end. When a disc is used the timing track is usually written as the extreme outside track on the flat surface of the disc. For the purpose of this description the word disc will be used but "-disc" should be construed to include drums, discs, and memory devices in general whether they are optical, magnetic, or others.

The apparatus of the present invention may be though of as including a write-erase circuit, a counter and a read-compare circuit. It will be understood by those skilled in the art, however, that a single head could be used to read, write and erase or that other parts of the circuits could be used to provide multiple functions.

The write-erase portion of the apparatus includes an electromagnetic transducer 11 and a write-erase source 13. The write-erase source may be a variable frequency square wave or sine wave generator, which also provides a zero frequency (DC) output, and includes any necessary amplifiers or pulse shapers. The transducer or write-erase head 11 is properly situated so that it will influence the timing track 15 of a magnetic rotating recording member 16.

The counter portion of the circuit includes a transducer or read head 17, which is positioned to respond to a sync or reference mark 18 on rotating recording member 16 and a counter 19. The counter is coupled to both the write-erase and the read-compare circuits as will be more fully explained hereinafter.

The read-compare portion of the circuit includes a second transducer 20 which is located to respond to the recorded marks or bits on the timing track 15. The output of transducer or read head 20 may be passed through a conventional amplifier 21 to a peak detector 23. Peak detector 23 responds to signals above a certain voltage to provide an output which is coupled to selector 25. Selector 25 (which could be a three-position switch with one position grounded) operates to either block the output from the detector (e.g., utilize the grounded position of the switch) or to pass the output of the detector 23 to either of two channels. The two channels are represented as paths or leads 27, 29.

The output of detector 23, when passed by selector 25 to channel or lead 27, is connected to the junction of a capacitor 31 and one input of a two-input comparator 33. The side of capacitor 31 which is not connected to comparator 33 is grounded. The output of detector 23, when passed by selector 25 to channel or lead 29, is connected to the junction of a capacitor 35 and a variable resistor 37. The side of capacitor 35 which is not connected to variable resistor 37 is grounded. The output from variable resistor 37 is connected to the other input of comparator 33.

Having thus described the circuitry and apparatus of the invention, the method of the invention will now be described. In understanding the invention it is beneficial to keep the basic discovery and principle in mind. According to the invention if timing marks or bits are written during multiple revolutions of the disc, there will be no (or very little) attenuation or distortion of the voltage amplitude when the timing bits are read back if the bits during a given disc revolution lie directly on top of (are in-phase with) the bits written during prior disc revolutions. Such a coincidence of the two timing tracks will usually produce an increase in the read back voltage amplitude, due to a greater number of magnetic dipoles being positively aligned by the second recorded track, than were aligned by the first recorded track.

It is preferred to initially erase the timing track 15 to assure that there are no spurious signals thereon. To accomplish this the disc is rotated by conventional means (not shown) in a clockwise direction and direct current is supplied by the write-erase source 13 to the windings of the write-erase head 11. This biases the magnetic disc 16 in one direction (commonly called negative) and establishes all the magnetic flux at a reference level as is well-known in the art. This erase step may be continued for a period in excess of one disc revolution to insure complete erasure.

During a single write revolution of the disc a series of pulses is generated by the write-erase source 13 which induces currents in the write head 11 causing corresponding switches in the state of flux on the disc 16. This manifests itself as a plurality of timing marks or bits 39 on the timing track 15 as is also well-known in the art.

Assume, for example, that 2144 bits are desired on the timing track. Both the speed of the rotating disc 16 and the frequency of the write pulses from the write-erase source 13 can be varied as is well-known to permit this number of pulses during a single revolution of the disc. Counter 19 may be set by sync pulse 18 and responds to the frequency of write-erase source 13 to count the number of marks written during a single revolution. The counter may be part of a servo-control system and, if an incorrect number of pulses is written, either the frequency of the write pulses or the frequency of the rotating disc or both is changed. Alternatively, after the writing revolution the counter could count the number of bits on the track by monitoring a subsequent revolution as is well-known in the art.

While the disc 16 is rotating, read head 20 picks up the changes in flux (timing marks or bits) 39 and this induces a current in the winding of read head 20. The current induced in the windings may be amplified by a conventional amplifier 21 and then fed to the peak detector 23. Selector 25 samples the average voltage amplitude of the timing track marks (the peak detector output) over a reference portion of the disc, i.e., any sector of the disc, and during the first phase of the recording, i.e., the recording of the timing track during a single revolution, selector 25 passes the voltage amplitude along channel 27. By way of example the counter could control selector 25 to sample bits 500 to 1000 of the 2144 bit timing track. As a simplified example, the operator of this system could watch the counter and manually turn selector 25 on at bit 500 and off at bit 1000. However, it is believed well-known in the art that counters and their associated logic have the capability of controlling devices based on the value in the counter. The average voltage from the peak detector 23 is thus stored across capacitor 31, the representativeness of the average voltage amplitude being directly proportional to the number of bits sampled. As such it is also applied as one voltage amplitude input to the comparator 33.

Now that the average amplitude of the timing track read back signals is stored across capacitor 31, the write-erase source 13 again generates a direct current signal to erase the timing marks 39 on timing track 15. Then, the write-erase source 13 provides a series of pulses or signals which are recorded through write head 11 as timing marks or bits 39 for two successive revolutions of the disc 16.

After the timing marks 39 have been written during two successive revolutions of the disc a second voltage readback sample is taken via read head 20, amplifier 21 and peak detector 23. Again selector 25 samples the timing track marks over a reference portion of disc 16. Since the magnetic coating on disc 16 may not be uniform it is preferred to use the same sample portion of the disc, e.g., bits 500–1000. Therefore, counter 19 again controls selector 25 to sample the desired portion of the disc and pass the average voltage amplitude on channel 29. The average voltage amplitude is thus stored on capacitor 35. However, the sampled portions need not be identical and, in fact, the entire track may be sampled. The voltage stored on capacitor 35 is attenuated, if necessary, by variable resistor 37 and then used as the other input to comparator 33. The purpose of variable resistor 37 is to compensate for the previously mentioned increase in the strength of the readback signal when the bits during the second revolution are directly on top of the bits written during the first revolution, resistor 37 acting in conjunction with the input impedance of the comparator as a voltage divider.

In one method of practicing the invention the operator manually connects selector 25 first to channel 27 (for the single-rotation-recording) and then to channel 29 (for multiple-rotation-recording). To evaluate the results of the timing track recording, the comparator 33 is strobed or sampled. If the average amplitude of the readback voltage from the timing marks written during one revolution of the disc equals the average amplitude of the readback voltage from the timing marks written during two successive revolutions of the disc (less any desired attenuation by variable resistor 37), then the output of the comparator will be TRUE. The comparator 33 is a bi-stable device, by common nomenclature the output in one state is referred to as "1," "ON," "TRUE," or "HIGH" and the output in the other state is referred to as "0," "OFF," "-FALSE" or "LOW." If the output is TRUE, then the recording or writing of the timing track marks is complete; the marks or bits are already on the disc.

If, however, the output of comparator 33 is FALSE, then there was lack of equality in the amplitudes of the two readback voltages. This indicates that when timing track bits were written during two successive revolutions the bits written during the second revolution were not placed directly on top of (in-phase with) the bits written during the first revolution. This was caused by an incorrect ratio of bit-writing-frequency-to-disc speed or deviations in disc speed. Therefore, it is necessary to erase the disc timing track, adjust the writing frequency-to-disc speed ratio and perform the entire operation (as described previously) again.

As an alternate method of practicing the invention the read head 20 could read the timing marks immediately after they were written rather than waiting for the marks to be written during one full revolution first. However, during that portion of the invention requiring writing during two successive revolutions it is apparent that read head 20 should not read the marks until disc 16 has been written on for one full revolution. Otherwise marks written only once will be read by the read head and this is not the desired data. Similarly a single head could be used to write during one (or more) revolutions and to read during different revolutions. Of course if one head is used it can not "read and write" during the same revolution.

It is therefore apparent that many modifications may be made without departing from the spirit and scope of this invention.

What is claimed is:

1. Apparatus for checking the recording of a timing track on a rotating recording member comprising:

means for recording timing signals on said track, and means for comparing the amplitude of single-rotation recorded timing signals and successive-rotation recorded timing signals on said track.

2. Apparatus for testing the recording of a timing track on a rotating recording member wherein said timing track has no electronically measurable closure point comprising:

means for writing timing track signals during at least one revolution of said member, means for reading said timing track signals and for providing an output signal for at least a portion of said track, the amplitude of said output signal being proportional to the strength of said timing track signals, and means for comparing the amplitude of said output signals from one revolution-writing on said member with the amplitude of said output signals from more than one successive revolution writing on said member.

3. The apparatus of claim 2 wherein said comparing means includes:

first storing means for storing output signals from a portion of said one revolution-writing of said member, and second storing means for storing output signals from a portion of said more than one successive revolution writing of said member.

4. The apparatus of claim 3 wherein each of said storing means stores signals from the same portion of said member.

5. The apparatus of claim 3 including:

means for selectively coupling the output of said reading and providing means to said first and second storing means.

6. The apparatus of claim 3 wherein said second storing means includes means for attenuating said output signal.

7. A method for testing the equality of spaces between timing track signals on a rotating member comprising the steps of:

writing timing track signals at a first frequency during a single complete revolution of said member, reading said timing track for providing a first readback voltage sample of at least a portion of said single revolution signals, writing timing track signals at said first frequency during a plurality of complete revolutions of said member, reading said timing track for providing a second readback voltage sample of at least a portion of said plurality of revolutions signals, and comparing the amplitudes of said first and second readback voltage samples.

8. The method of claim 7 including the step of:

changing the ratio of said timing-track-writing-frequency to said rotating-member-speed and repeating all the steps of claim 7, if, but only if, the amplitude of said first and second readback voltage samples are not substantially equal.

9. The method of claim 7 wherein:

said step of reading and providing said first readback voltage sample includes the step of storing said first readback voltage sample, and said step of reading and providing said second readback voltage sample includes the step of separately storing said second readback voltage sample.

10. The method of claim 9 including the step of:

attenuating said second readback voltage sample prior to said step of comparing.

* * * * *